United States Patent
Rodman et al.

(10) Patent No.: US 6,959,260 B2
(45) Date of Patent: Oct. 25, 2005

(54) SYSTEM AND METHOD FOR DEVICE CO-LOCATION DISCRIMINATION

(75) Inventors: Jeffrey Rodman, San Francisco, CA (US); Gil Pearson, San Francisco, CA (US)

(73) Assignee: Polycom, Inc., Milpitas, CA (US)

( * ) Notice: Subject to any disclaimer, the term of this patent is extended or adjusted under 35 U.S.C. 154(b) by 783 days.

(21) Appl. No.: 10/023,572

(22) Filed: Dec. 17, 2001

(65) Prior Publication Data

US 2002/0101918 A1 Aug. 1, 2002

Related U.S. Application Data (60) Provisional application No. 60/255,813, filed on Dec. 15, 2000.

(51) Int. Cl.[7] .............................................. G06F 19/00
(52) U.S. Cl. .................... 702/150; 342/450; 455/404.2; 455/456.1; 455/67.11
(58) Field of Search ................ 702/71, 150; 455/404.2, 455/456.1, 67.11; 342/450; 356/3; 367/118; 340/539.13

(56) References Cited

U.S. PATENT DOCUMENTS

| | | | |
|---|---|---|---|
| 4,484,027 A | | 11/1984 | Lee et al. ................. 178/22.13 |
| 5,450,615 A | | 9/1995 | Fortune et al. |
| 5,481,611 A | | 1/1996 | Owens et al. .................. 380/25 |
| 5,638,450 A | | 6/1997 | Robson ........................ 380/49 |
| 5,719,584 A | * | 2/1998 | Otto .......................... 342/465 |
| 5,809,148 A | | 9/1998 | Doberstein et al. ............ 380/45 |
| 5,890,068 A | * | 3/1999 | Fattouche et al. ........ 455/456.2 |
| 5,892,454 A | | 4/1999 | Schipper et al. |
| 5,977,913 A | | 11/1999 | Christ |
| 6,026,304 A | * | 2/2000 | Hilsenrath et al. ........ 455/456.2 |
| 6,047,192 A | * | 4/2000 | Maloney et al. .......... 455/456.2 |
| 6,104,344 A | * | 8/2000 | Wax et al. ................... 342/378 |
| 6,108,557 A | * | 8/2000 | Wax et al. ................ 455/456.2 |
| 6,127,975 A | * | 10/2000 | Maloney ...................... 342/457 |
| 6,185,152 B1 | | 2/2001 | Shen |
| 6,222,859 B1 | | 4/2001 | Yoshikawa ................... 370/522 |
| 6,288,676 B1 | * | 9/2001 | Maloney ...................... 342/457 |
| 6,297,892 B1 | | 10/2001 | Stein, III et al. ............ 358/443 |
| 6,425,084 B1 | | 7/2002 | Rallis et al. ................. 713/185 |
| 6,546,256 B1 | * | 4/2003 | Maloney et al. .......... 455/404.2 |
| 6,792,112 B1 | | 9/2004 | Campbell et al. ............ 380/270 |
| 6,871,077 B2 | * | 3/2005 | Kennedy, Jr. ............. 455/456.5 |
| 2001/0011954 A1 | * | 8/2001 | Shelton et al. .......... 340/825.49 |
| 2001/0022558 A1 | * | 9/2001 | Karr et al. ................... 342/450 |
| 2003/0129996 A1 | * | 7/2003 | Maloney et al. ............. 455/456 |
| 2004/0013105 A1 | | 1/2004 | Ahmavaara et al. ......... 370/349 |

OTHER PUBLICATIONS

Schneier, Bruce, "*Applied Cryptography, Second Edition –Protocols, Algorithms, and Source Code in C;* " John Wiley & Sons, Inc. 1996; pp. 176–183.

Menezes, Vanstone, Oorshot; "*Handbook of Applied Crptography*" CRC Press LLC 1997; pp. 362–363, 551–553, 580.

Copy of Search Report Received in Co–Pending European Patent Application; Jun. 16, 2005.

* cited by examiner

*Primary Examiner*—Patrick J. Assouad
(74) *Attorney, Agent, or Firm*—Wong, Cabello, Lutsch, Rutherford & Brucculeri, LLP (57) ABSTRACT

A system and method for determining if a first and second device are co-located includes first and second sensors for receiving a sample signal. Each sensor is coupled to the first and second devices. The first and second devices each responsively generate a first and second signal representing the sampled signal. Also included is a transmission device located at the first device for transmitting the first signal to the second device and a receiving device located at the second device for receiving the first signal from the first device. Finally, a signal analysis device determines if the first and second devices are co-located.

30 Claims, 6 Drawing Sheets

SYSTEM AND METHOD FOR DEVICE CO-LOCATION DISCRIMINATION

CROSS-REFERENCE TO RELATED APPLICATIONS

This application claims the benefit of U.S. Provisional Application No. 60/255,813, filed Dec. 15, 2000.

BACKGROUND OF THE INVENTION

1. Field of the Invention

The present invention relates generally to networked electronic systems, and more particularly to a system and method for determining whether components of a wireless networked system are co-located within a common room or area.

2. Description of the Background Art

Increasingly, electronic communication systems such as audio or video conferencing systems are utilizing wireless networks to link system components such as microphones, speakers, and the like. Wireless networks offer the substantial benefit of eliminating cables and associated connectors and allow component devices to be easily and freely positioned relative to each other. Additionally, wireless networks allow system components to be easily rearranged to suit the needs of the user.

A disadvantage associated with wireless communication systems is the potential for unintended dissemination of confidential or sensitive information. In a conference setting, it is desirable to limit access to the conference information only to conference participants. To facilitate this need, conference systems are typically located in a fully enclosed space such as a conference room. However, most commercially available wireless networked communication systems employ radio frequency (RF) signals to transmit data between and among the various system components. These RF signals may easily penetrate walls, ceilings, and other room barriers, and thus be inadvertently transmitted to components outside of the present communication system (e.g., a component of another wireless system located in a second conference room). Data transmission of RF signals outside of the immediate conference room may result in an unintentional and undesirable disclosure of proprietary or sensitive information, and also allows interception by eavesdroppers or industrial spies, thereby compromising confidentiality.

One method of preventing the inadvertent dissemination of confidential information is to encrypt transmissions between the system components. Alternatively, the carrier frequencies used for transmitting conference data may be varied. However, such solutions are generally difficult to implement, expensive, and/or may require user intervention.

Accordingly, there is a need for a system and method for determining whether wireless networked components are co-located within a common room or area. There is a more specific need for a system and method for discriminating between co-located conference components and external (out-of-room) components, which does not require operator intervention.

SUMMARY

The present invention provides a system and method for determining whether wireless networked devices are co-located within a conference or other room, and discriminating against those which are not co-located. In one embodiment, components of a wireless conferencing system are each provided with an acoustic sensor or similar instrument for detecting ambient or specially generated acoustic signals, and responsively generating signals representative of the detected sounds. These representative signals concurrently generated by each of the conferencing system components are transmitted via radio frequency to a signal analysis processor (SAP), which compares the signals to a reference signal (which is typically a signal generated by a component known to be located within the conference room) for co-location. The SAP may be embodied in any of the system components or in a separate device designated for the discrimination analysis. The SAP may utilize any one of a number of well-known signal comparison techniques, including correlated envelope energy analysis, harmonic frequency energy comparison, and cross-correlation analysis.

Since sound is attenuated by walls and other barriers, representative signals generated by components located outside of the conference room will not match the reference signal. Upon a determination that the representative signal received from a system component does not match the reference signal and thus is not co-located, a base station of the conferencing system (which manages communications to and from the various components) discriminates against the non co-located component to prevent subsequent date transmissions to or from the non co-located component.

Alternative embodiments of the invention may employ comparative analysis of other types of ambient or specially generated energy detected at each of the conference system components, wherein the ambient or specially generated energy is of a form (e.g., infrared energy) which does not readily penetrate conference room walls or similar barriers.

DETAILED DESCRIPTION OF THE INVENTION

Figure 1:
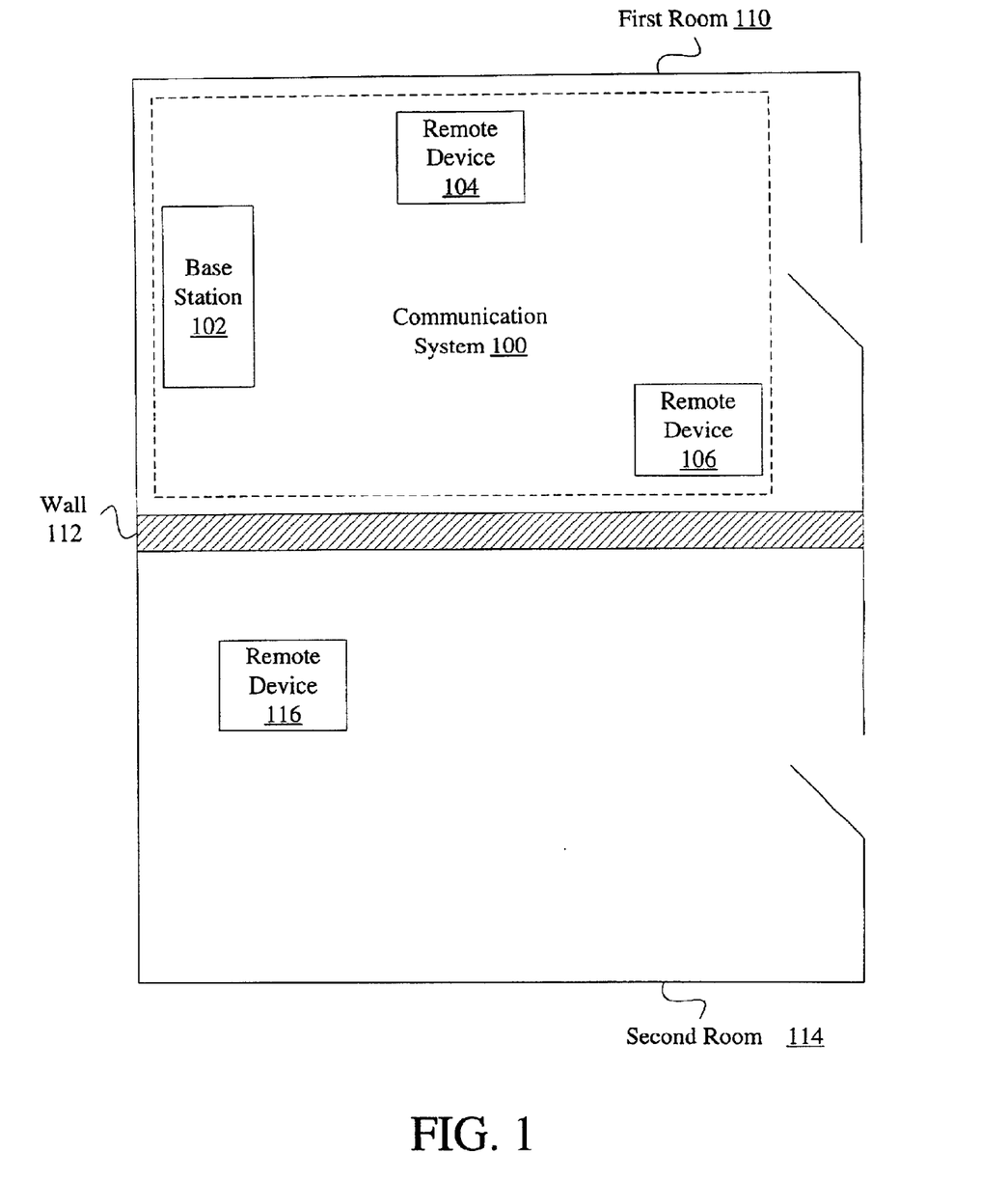
FIG. 1 is a top view of an exemplary environment where embodiments of the present invention may be implemented.

FIG. 1 depicts components of an exemplary wireless communication system 100 for conducting meetings between persons or groups of persons located remotely from each other. The communication system 100 may comprise, but is not limited to, a video conferencing or audio conferencing system of the type sold by Polycom, Inc. of Milpitas, Calif. The communication system 100 includes a base station 102 having primary system circuitry configured to receive and process conference data. Additionally, base station 102 may be configured to manage communications with other conferencing systems (e.g., video conferencing systems located at other sites) over conventional circuit or packet switched networks, such as a public switched telephone network or the Internet.

The communication system 100 also includes a plurality of remote devices 104, 106, which communicate with the base station 102 and each other through electromagnetic signals, typically radio frequency (RF) signals. Alternatively, infrared signals or other suitable electromagnetic signals may be employed for communication between various communication components. Remote devices 104, 106 may include wireless microphones, wireless speakers, or other devices coupled wirelessly such as personal computers, LCD projectors, video monitors, and other conference-related items. It is noted that while two remote devices 104, 106 are depicted in FIG. 1, a lesser or greater number of remote devices may be utilized.

The components of the communication system 100 are located within a first conference room 110. Those skilled in the art will appreciate that even low power RF signals will easily penetrate walls and similar physical barriers, such as a wall 112 separating an adjacent second conference room 114 from the first conference room 110. Occasionally, RF signals generated by the base station 102 located in the first conference room 110 may be communicated to a remote device 116, which is not part of communication system 100, located in the second conference room 114. The information underlying the transmitted RF signals may be inadvertently disseminated to persons having access to the remote device 116. If this information is sensitive, the confidentiality of the information is then compromised. Further, RF signals generated by the remote device 116 may inadvertently be transmitted and subsequently processed by the base station 102.

The present system and method will secure against inadvertent disclosure of confidential information. Inadvertent disclosure is prevented by determining which remote devices are co-located in the same communication system 100 as the base station 102, and thus only allow co-located devices to exchange conference data with each other and the base station 102. The term "conference data", as used herein, denotes data representative of any information which may be presented to users of the communication system 100 during the operating thereof, including speech, images, and the like. As previously mentioned, the conference data is typically exchanged between components of the communication system 100 through the use of RF signals.

For co-location discrimination analysis, an acoustic signal is sampled by all communication components (i.e., 102, 104, and 106). This acoustic signal is separate and distinct from the radio frequency (RF) signals typically used for data exchange, and is not in the same frequency band as the RF signals. Thus, the acoustic signal may include ultrasonic and subsonic audio sources. Furthermore, the acoustic signal may be environmental (i.e. speech within the room) or specifically generated for co-location discrimination analysis. Although the present embodiment is described as using acoustic signals, those skilled in the art will recognize that alternative energy signals or light signals, such as infrared signals pulsing through light emitting diodes (LED) may be utilized for the discrimination analysis.

Because the acoustic signal is attenuated outside of the first room 110, the remote device 116 located in the second room 114 will sample a weaker or dissimilar acoustic signal as compared to the remote devices 104, 106 located in the first room 110. Thus, a comparison of the sample taken by the remote device 116 will be different from the samples taken by the base station 102 and the remote devices 104, 106, thereby resulting in a determination by a signal analysis processor (not shown) within the communication system 100 that the remote device 116 is not co-located in the first room 110.

Furthermore, the co-location discrimination analysis can be continuous or pulsed. Continuous discrimination analysis will occur at low levels so as not to disturb occupants of the first room 110. Alternatively, analysis may be conducted periodically. For example, the discrimination analysis may shut down for a period of time before subsequently activating to sample, process, and analyze acoustics signals before shutting down again.

Additionally, the length of time for acoustic signal sampling is dependent upon the desired accuracy of the discrimination analysis. For higher accuracy, the sampling must be of a longer duration while a lower accuracy will allow for a relatively shorter sampling of the acoustic signal.

Figure 2:
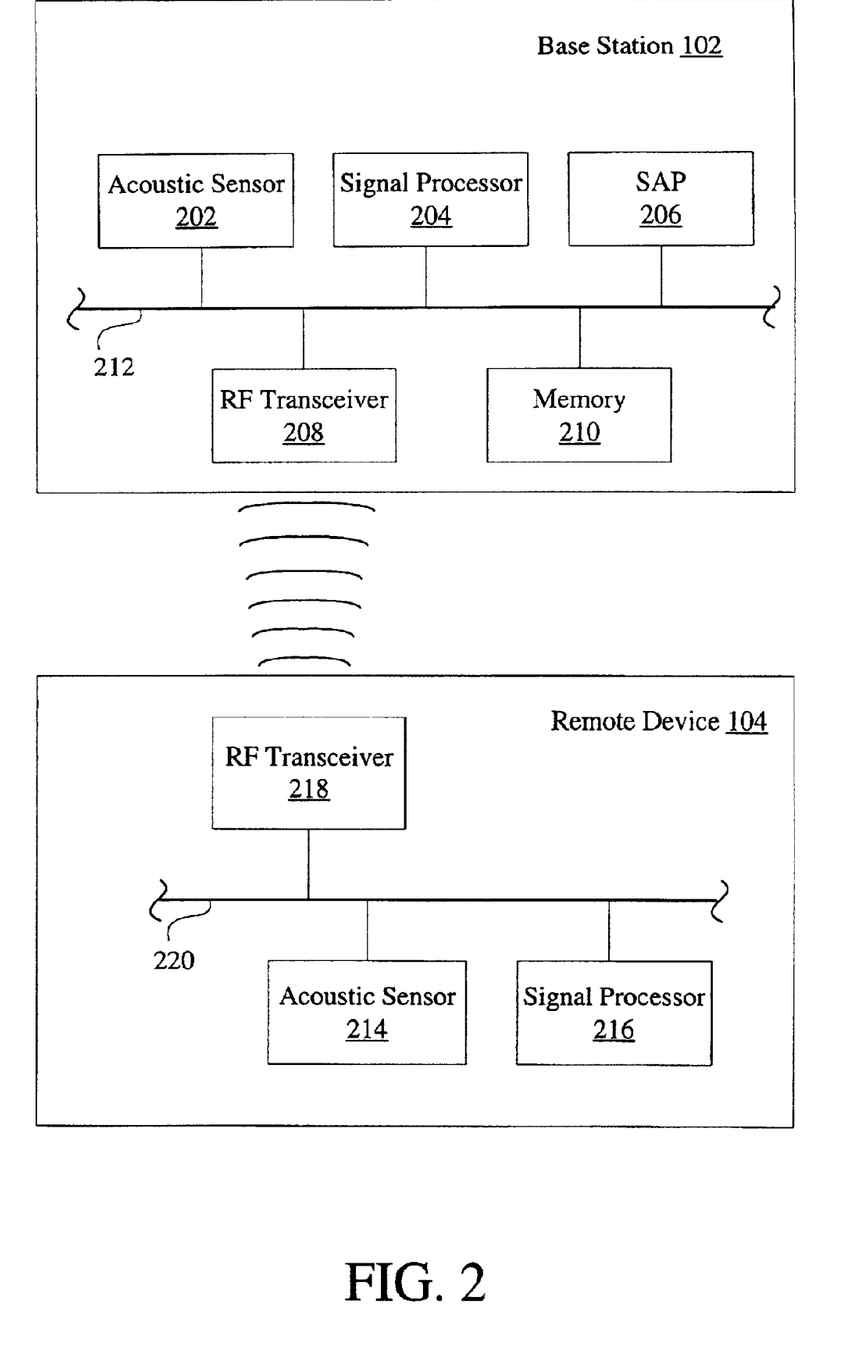
FIG. 2 is a block diagram of an exemplary base station and remote device of the present invention.

Referring to FIG. 2, discrimination analysis components of a base station 102 and an exemplary remote device 104 are depicted. In one embodiment, base station 102 performs the co-location discrimination analysis, and is preferably provided with an acoustic sensor 202, a signal processor 204, a signal analysis processor (SAP) 206, an RF transceiver 208, and a memory 210 all coupled to a common system bus 212. The acoustic sensor 202 samples an external acoustic signal and forwards the sample to the signal processor 204 for processing. The signal processor 204 converts the sample into a digital signal that is representative of the sampled acoustic signal. This digital signal is sent to an SAP 206 and subsequently becomes the reference signal for discrimination analysis.

The sampled acoustic signal may be ambient or specifically generated for discrimination analysis. For example, a signal generator may be contained within the base station 102 or the remote devices 104, 106 (FIG. 1). This signal generator may be embodied as a speaker emitting sound waves, or alternatively, a light-emitting diode (LED) device for emitting infrared or other light. Those skilled in the art will recognize that other forms of detectable energy signals may be generated and utilized for discrimination analysis.

As shown further in FIG. 2, the remote device 104 is provided with an acoustic sensor 214, a signal processor 216, and an RF transceiver 218. Each component of the remote device 104 is directly coupled to a common system bus 220.

The acoustic sensor 214 samples the same external acoustic signal as that sampled by the base station 102, and forwards the sample to the signal processor 216. The signal processor 216 subsequently converts the sample into a digital signal that is representative of the sampled acoustic signal. The RF transceiver 218 then sends this representative signal to the RF transceiver 208 of the base station 102. Thus, these RF transceivers 208, 218 may be utilized for both data conference transmissions and discrimination analysis transmissions. The RF transceiver 208 forwards the representative signal received from the remote device 104 to the SAP 206 for discrimination analysis. The SAP 206 compares the reference and representative signals to determine whether the signals are equivalent or within a predetermined threshold. If the SAP 206 determines signal equivalence, the remote device 104 is co-located within the same wireless communication system as the base station 102.

The memory 210 may embody a list of remote devices in communication with the base station 102. This list is periodically updated when a remote device is determined to be external to or non co-located with the communication system of the base station 102. If the SAP 206 determines that a remote device and the base station 102 are not within the same communication system, the base station 102 discriminates against the non co-located device by removing the remote device from the list in memory 210. Consequently, all communications with the non co-located device are discontinued, information received from this non co-located device is not processed, and the base station 102 may transmit a shutdown signal to the non co-located device.

Thus, the embodiment shown in FIG. 2 illustrates discrimination analysis being performed by the base station 102. The remote devices forward their representative signals to the base station for comparison with the reference signal. If the reference and representative signals are comparable, then the SAP 206 concludes that the remote device is co-located within the same communication system as the base station 102. However, if the remote device is not co-located, the base station 102 discriminates against the remote device by disregarding all communications with the remote device. Additionally, the base station 102 may send a shutdown signal to the non co-located remote device.

Figure 3:
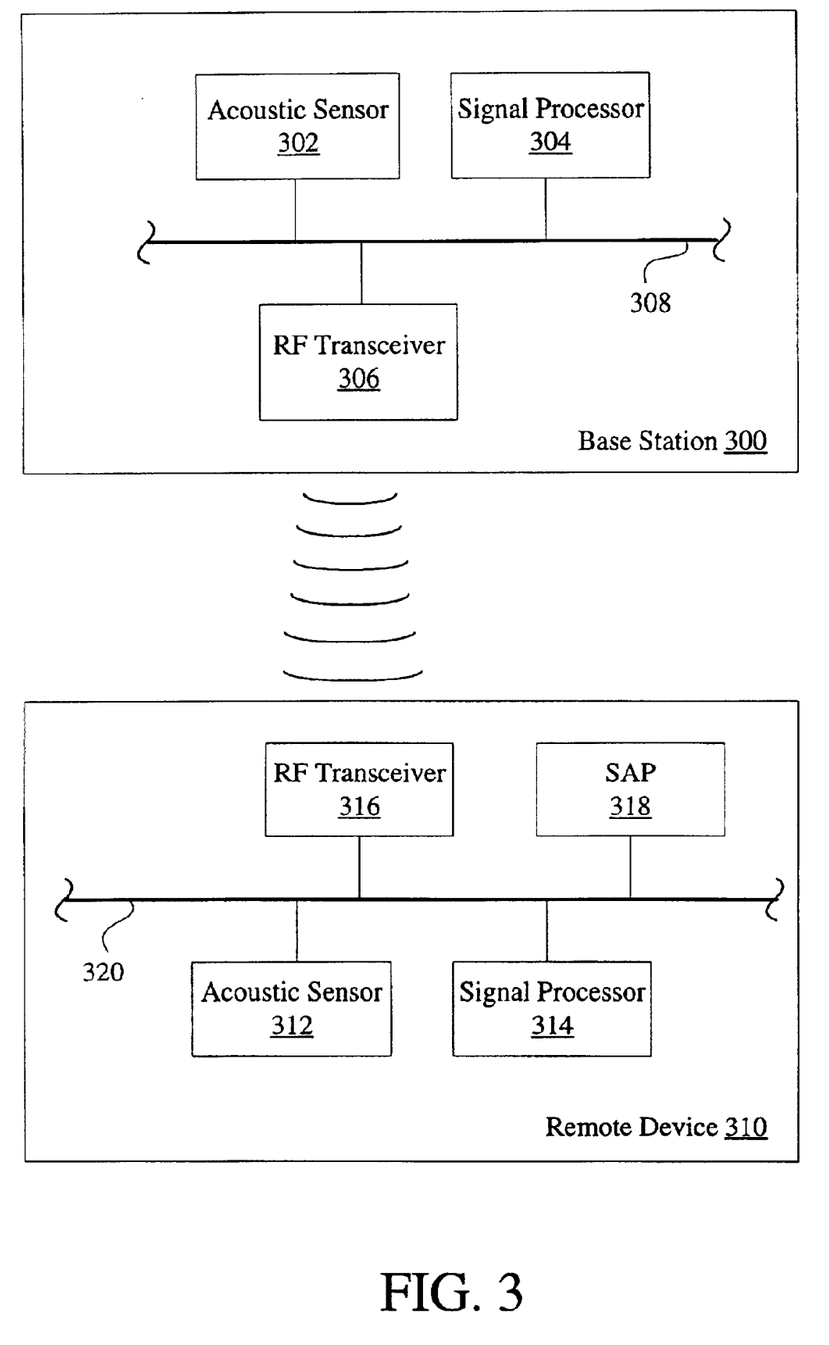
FIG. 3 is a block diagram of an exemplary alternative base station and remote device of the present invention.

In another embodiment of the communication system, each remote device conducts the co-location discrimination analysis. FIG. 3 shows a block diagram of discrimination analysis components of a base station 300 and an exemplary remote device 310 for the alternative embodiment. The base station 300 includes an acoustic sensor 302, a signal processor 304, and an RF transceiver 306 all coupled to a common system bus 308.

As previously discussed in connection with the acoustic sensor 202, the acoustic sensor 302 samples an external acoustic signal and forwards the sample to the signal processor 304, which converts the sample into a digital signal representative of the sampled acoustic signal. Subsequently, this representative signal is forwarded via the system bus 308 to the RF transceiver 306, where the representative signal is transmitted to each remote device 310. In this embodiment, the digital signal from the base station 300 is the representative signal used for discrimination analysis.

FIG. 3 also depicts components of an exemplary remote device 310, which includes an acoustic sensor 312, a signal processor 314, an RF transceiver 316, and a signal analysis processor (SAP) 318. At relatively the same instance the base station 300 samples an external acoustic signal; each remote device 310 also samples the same acoustic signal with the acoustic sensor 312. The signal processor 314 subsequently converts the sample into a digital signal that is representative of the sampled acoustic signal. This digital signal is subsequently forwarded via a system bus 320 to the SAP 318 for discrimination analysis. Because each remote device 310 performs the discrimination analysis, the digital signal generated by the signal processor 314 is the reference signal. If the SAP 318 determines that the reference and representative signals are not similar, then the remote device 310 is not co-located within the same communication system as the base station 300. Consequently, the remote device 310 stops communicating with the wireless communication system of the base station 300, and may subsequently shut itself down.

Figure 4:
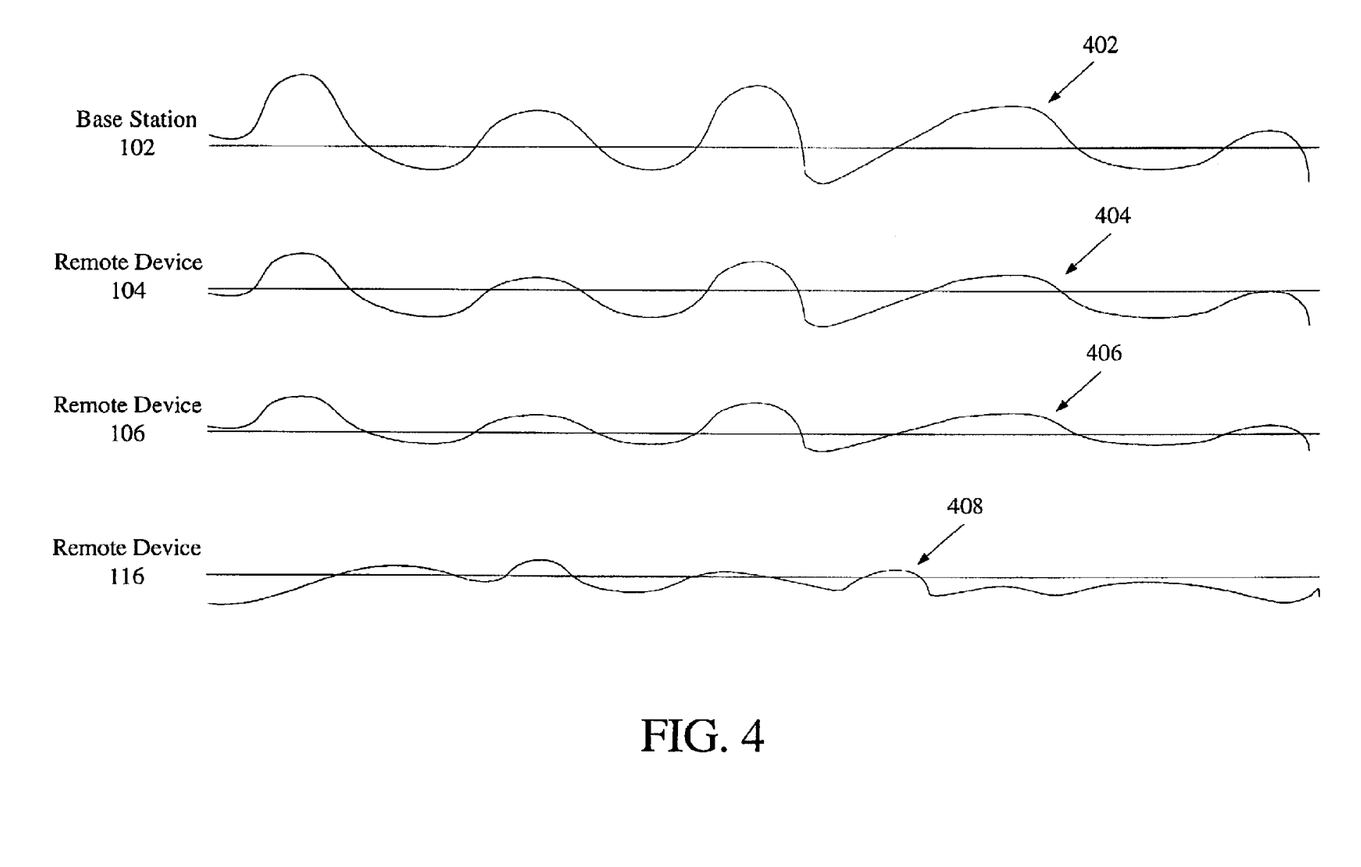
FIG. 4 is a diagram of signal waveform comparisons.

FIG. 4 is a diagram comparing signal waveforms of reference and representative signals. For simplicity of illustration, FIG. 4 will be discussed in connection with the communication system utilizing the embodiment of FIG. 1 and FIG. 2. As shown, the base station 102 (FIG. 1) produces a reference signal 402 that is representative of a sampled acoustic signal. At relatively the same instance, the remote devices 104, 106, and 116 also sample and process the same acoustic signal. This results in the remote devices 104, 106, and 116 producing representative signals 404, 406, and 408, respectively.

There are many well-known methods for comparing acoustic signals, which may be implemented for co-location discrimination analysis. One such method is correlated envelope energy analysis. In this method, the SAP 206 (FIG. 2) determines if an envelope of each of the representative signals 404, 406, and 408 is similar in form to an envelope of the reference signal 402. Thus, the similarity in amplitude of the waves is less important than whether the representative signals 404, 406, and 408 have generally similarly occurring valleys and peaks.

An alternative method involves a comparison of (harmonic) frequency energy. In this method, for example, the SAP 206 determines if a high pitch sound received at the base station 102 is also perceived at each remote device 104, 106, 116. Thus, this method searches for correlation between the sinusoidal components of representative signals 404, 406, and 408 with the sinusoidal components of reference signal 402.

Additionally, cross-correlation analysis of the local and remote representative signals may determine if the devices sampled the same acoustic signal. This method generally compares the peaks of the representative signals 404, 406, and 408 with the reference signal 402 to determine if similar peaks exist. Those skilled in the art will recognize that many other methods of signal analysis may be utilized for co-location discrimination.

Since the remote devices 104, 106 are located within the first room 110 (FIG. 1) with the base station 102, remote representative signals 404 and 406 are very similar to the reference signal 402 of the base station 102. Therefore, the SAP 206 analysis concludes that the remote devices 104, 106 are co-located within the same communication system as the base station 102, and will continue to communicate with the remote devices 104, 106.

The remote device 116 is not located within the communication system 100 (FIG. 1) of the first room 110. Since the acoustic signal distorts while traveling through the wall 112 (FIG. 1), the representative signal 408 is dissimilar to the reference signal 402 of the base station 102. Therefore, the SAP 206 analysis will conclude that the remote device 116 and the base station 102 are not co-located. Discrimination against the remote device 116 will thus occur wherein communications between the remote device 116 and the base station 102 are disregarded, and remote the device 116 may shut down.

Figure 5:
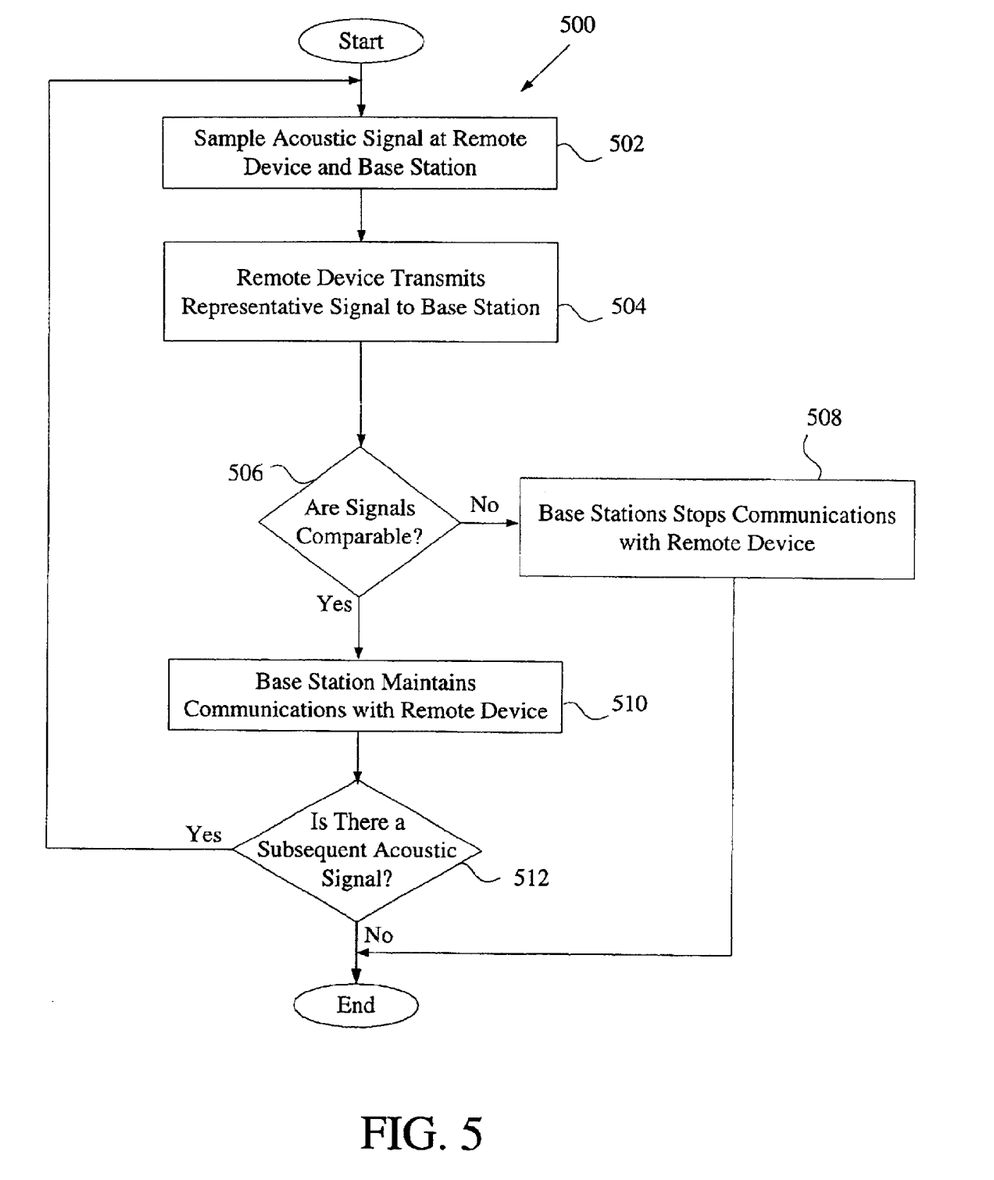
FIG. 5 is a flowchart showing the steps of a method for co-location discrimination analysis, according to the present invention.

FIG. 5 is a flowchart 500 that illustrates a method for co-location discrimination analysis with the analysis being performed at the base station 102 (FIG. 2). Initially in step 502, a remote device 104 (FIG. 2) and the base station 102 sample an acoustic signal with their respective acoustic sensors 214, 202 (FIG. 2). This acoustic signal may be from an external environmental source or be generated by a remote device 104 or by the base station 102. Alternatively, other forms of energy signals may be utilized for the analysis such as a light signal emitted from a light-emitting diode (LED) device. The samples are then processed into digital signals that are representative of the acoustic signal. Since the base station 102 performs the discrimination analysis, the representative signal generated by the base station 102 is the reference signal.

In step 504, the remote device 104 transmits its representative signal of the acoustic signal sample to the base station 102 for co-location discrimination analysis. The representative signal is received by an RF transceiver 208 (FIG. 2) in the base station 102, and is subsequently forwarded to an SAP 206 (FIG. 2). In step 506, the SAP 206 compares the representative signal with the reference signal generated by the base station 102. Those skilled in the art will recognize that there are numerous ways to conduct this analysis. Some of these methods include correlated envelope energy analysis, (harmonic) frequency energy comparison, and straight correlation analysis.

If in step 506 the analysis shows that the representative signal is not similar to the reference signal, then in step 508, the base station 102 removes the remote device 104 from a communication list stored in memory 210 (FIG. 2) and stops processing conference data from/for this particular remote device 104. Additionally, a signal may be sent to the non co-located remote device to shut down. Alternatively, if the reference and representative signals are comparable, then the base station maintains communications with the remote device in step 510.

Should co-location discrimination analysis continue either periodically or continuously, then in step 512 a subsequent acoustic signal will be perceived, and the discrimination analysis will proceed through another cycle. Alternatively, if the conference concludes, then there will not be a subsequent acoustic signal and the co-location discrimination analysis ends.

Figure 6:
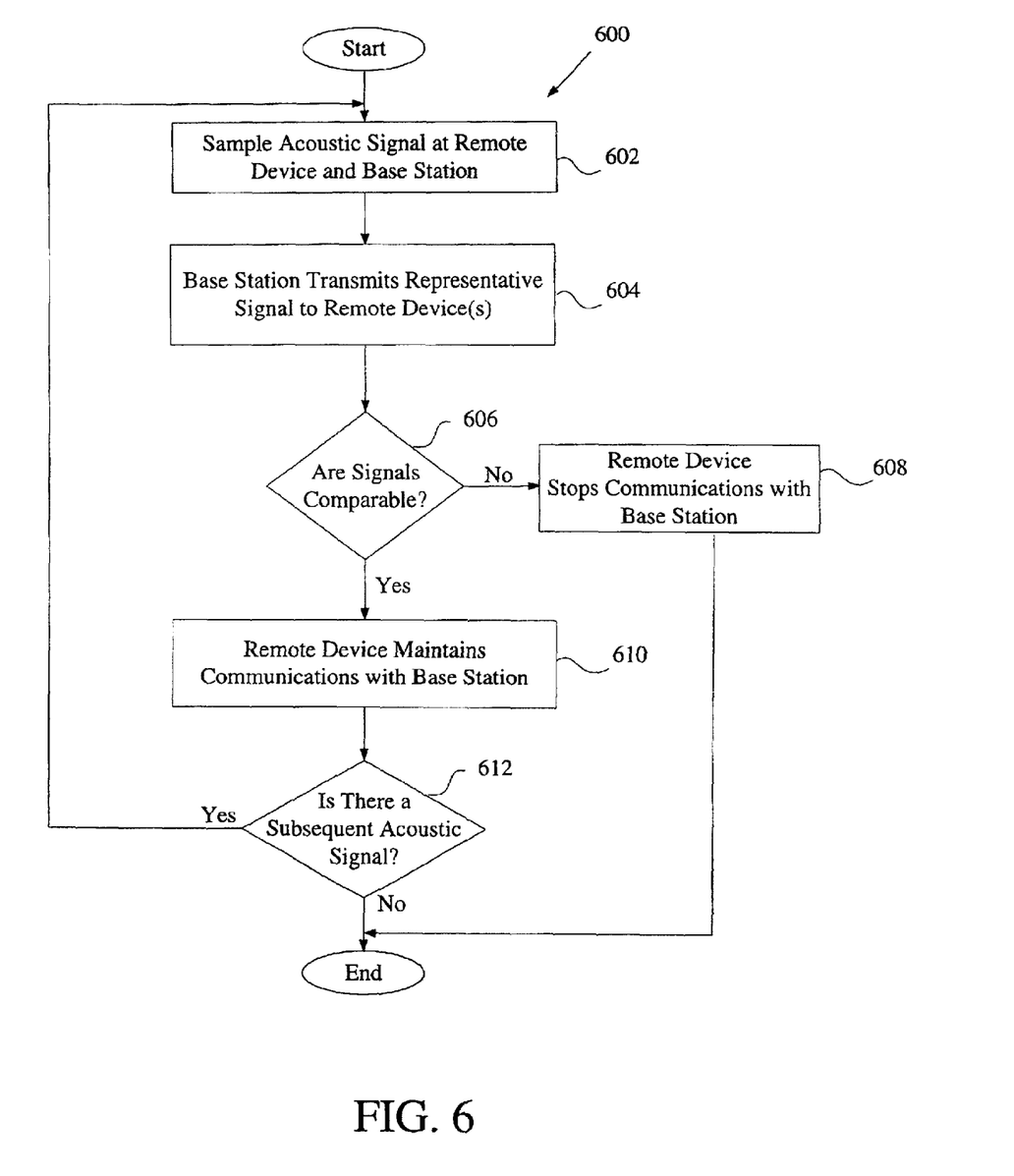
FIG. 6 is a flowchart of an alternative method for co-location discrimination analysis, according to the present invention.

FIG. 6 is a flowchart 600 illustrating another method for co-location discrimination analysis wherein each remote device performs the co-location discrimination analysis. Initially in step 602, a remote device 310 (FIG. 3) and a base station 300 (FIG. 3) sample an acoustic signal, and process the samples into digital signals that are representative of the acoustic signal. Since the remote device 310 performs the discrimination analysis, the digital signal of the remote device 310 is the reference signal.

In step 604, the base station 300 transmits its representative signal to each remote device 310. Each remote device 310, upon receipt of the representative signal, forwards the representative signal to an SAP 318 (FIG. 3).

In step 606, the SAP 318 compares the representative signal to the reference signal generated by each remote device 310. The discrimination analysis may include such methods as correlated envelope energy, (harmonic) frequency energy, and straight correlation analysis. If in step 606 the analysis shows the reference and representative signals are dissimilar, then in step 608, the remote device 310 stops communicating with the base station 300. Furthermore, the remote device 310 may shut itself down. Alternatively, if the reference and representative signals are comparable, then the remote device 310 maintains communications with the base station 300 in step 610.

Should the conference continue, then in step 612, a subsequent acoustic signal is generated and the discrimination analysis will proceed through another cycle.

The invention has been explained above with reference to particular embodiments. Other embodiments will be apparent to those skilled in the art in light of this disclosure. For example, a separate, dedicated device may contain an SAP for performing the co-location discrimination analysis. Alternatively, reference signals may be generated by a third device known to be within the communication system. Any device that contains an SAP can then utilize this reference signal. Therefore, these and other variations upon the specific embodiments are intended to be covered by the present invention, which is limited only by the appended claims.

What is claimed is:

1. A method for determining if a first and a second device are co-located, comprising the steps of:
    sampling a sample signal at the first device and responsively generating a first representative signal of the sample signal;
    sampling the sample signal at the second device and responsively generating a second representative signal of the sample signal;
    transmitting the second representative signal to the first device; and
    comparing the first representative signal to the second representative signal.

2. The method of claim 1, wherein the sample signal comprises an acoustic signal.

3. The method of claim 1, wherein the sample signal comprises a light signal.

4. The method of claim 1, wherein the first and second representative signals comprise a digitized signal of the sample signal.

5. The method of claim 1, wherein the step of comparing comprises correlated envelope signal analysis of the first and second representative signal to determine if the first and second representative signals are similar in form.

6. The method of claim 1, wherein the step of comparing comprises harmonic frequency signal analysis of the first and second representative signal to determine if the first and second representative signals are similar in form.

7. The method of claim 1, wherein the step of comparing comprises cross-correlating the first and second representative signal to determine if the first and second representative signals are similar in form.

8. The method of claim 1, wherein the first device is a base station and the second device is a remote device.

9. The method or claim 1, wherein the first device is a remote device and the second device is a base station.

10. The method of claim 1, wherein the sample signal is generated by the first device.

11. The method of claim 1, wherein the sample signal is generated by the second device.

12. The method of claim 1, wherein the first and second device communicate wirelessly.

13. A method for discriminating between data received from co-located and non co-located devices, comprising the steps of:
    receiving at a base station data from a remote device;
    sampling a sample signal at the remote device and responsively generating a first representative signal of the sample signal;
    sampling the sample signal at the base station and responsively generating a second representative signal of the sample signal;
    determining if the base station and the remote device are co-located; and
    processing the data received by the base station if the remote device is co-located.

14. The method of claim 13, wherein the data is embodied in the form of radio frequency.

15. The method of claim 13, wherein the step of determining further comprises transmitting the first and second representative signals to a third device known to be co-located with the base station for comparison.

16. The method of claim 13, wherein the step of determining further comprises transmitting the first representative signal to the base station for comparison.

17. The method of claim 13, wherein the step of determining further comprises transmitting the second representative signal to the remote device for comparison.

18. A system for determining if a first device and a second device are co-located comprising:
    a first sensor located at the first device for receiving a sample signal, the first device responsively generating a first signal representing the sample signal;

a second sensor located at the second device for receiving a sample signal, the second device responsively generating a second signal representing the sample signal;

a transmission device located at the first device for transmitting the first signal to the second device;

a receiving device located at the second device for receiving the first signal from the first device; and a signal analysis device for determining if the first and second devices are co-located.

19. The system of claim 18, wherein the first and second sensor comprise an acoustic sensor and the sample signal is an acoustic signal.

20. The system of claim 18, wherein the first and second sensor comprise a photodetector and the sample signal is a modulated beam of light.

21. The system of claim 18, wherein the first device is a remote device and the second device is a base station.

22. The system of claim 18, wherein the first device is a base station and the second device is a remote device.

23. The system of claim 18, wherein the signal analysis device compares the first and second signals in order to determine if the first and second devices are co-located.

24. The system of claim 18, wherein the signal analysis device is coupled to the first device.

25. The system of claim 18, wherein the signal analysis device is coupled to the second device.

26. The system of claim 18, wherein the signal analysis device is coupled to a third device, the third device known to be co-located with the first device.

27. The system of claim 18, wherein the signal analysis device is coupled to a third device, the third device known to be co-located with the second device.

28. A system for determining if a first and second device are co-located comprising:

means for sampling a sample signal at the first device;

means for responsively generating a first representative signal of the sample signal at the first device;

means for sampling the sample signal at the second device;

means for responsively generating a second representative signal of the sample signal at the second device;

means for transmitting the second representative signal to the first device; and means for comparing the first representative signal to the second representative signal.

29. A computer readable medium having embodied thereon a program, the program being executable by a machine to perform method steps for determining if a first and a second device are co-located, the method steps comprising:

sampling a sample signal at the first device and responsively generating a first representative signal of the sampled signal;

receiving from the second device a second representative signal of the sample signal; and comparing the first representative signal to the second representative signal.

30. A method for discriminating between data received from co-located and non co-located devices, comprising the steps of:

receiving at a remote device data from a base station;

sampling a sample signal at the base station and responsively generating a first representative signal of the sample signal;

sampling the sample signal at the remote device and responsively generating a second representative signal of the sample signal;

determining if the remote device and the base station are co-located; and processing the data received by the remote device if the base station is co-located.

* * * * *